(12) United States Patent
Katano et al.

(10) Patent No.: US 7,680,693 B2
(45) Date of Patent: Mar. 16, 2010

(54) PRODUCT PURCHASE SUPPORTING SYSTEM

(75) Inventors: Kazuhito Katano, Gunma (JP); Makoto Moriya, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/978,717

(22) Filed: Oct. 18, 2001

(65) Prior Publication Data

US 2002/0087434 A1 Jul. 4, 2002

(30) Foreign Application Priority Data

Dec. 15, 2000 (JP) .................. P. 2000-382574

(51) Int. Cl.
*G06Q 30/00* (2006.01)

(52) U.S. Cl. .................. 705/26; 705/27; 707/1; 707/3; 707/102; 709/203

(58) Field of Classification Search .................. 705/26, 705/27; 707/1, 3, 502, 102; 709/203
See application file for complete search history.

(56) References Cited

U.S. PATENT DOCUMENTS

| | | | | |
|---|---|---|---|---|
| 5,149,204 A | * | 9/1992 | Tennichi | 384/15 |
| 5,277,498 A | * | 1/1994 | Kawaguchi | 384/45 |
| 6,055,516 A | * | 4/2000 | Johnson et al. | 705/27 |
| 6,064,979 A | * | 5/2000 | Perkowski | 705/26 |
| 6,505,172 B1 | * | 1/2003 | Johnson et al. | 705/27 |
| 2001/0042002 A1 | * | 11/2001 | Koopersmith | 705/10 |
| 2001/0044751 A1 | * | 11/2001 | Pugliese et al. | 705/26 |
| 2002/0022995 A1 | * | 2/2002 | Miller et al. | 705/14 |
| 2002/0026380 A1 | * | 2/2002 | Su | 705/26 |
| 2002/0052807 A1 | * | 5/2002 | Han et al. | 705/27 |
| 2002/0178091 A1 | * | 11/2002 | O'Hagan et al. | 705/27 |
| 2004/0015479 A1 | * | 1/2004 | Meek et al. | 707/1 |

FOREIGN PATENT DOCUMENTS

| | | |
|---|---|---|
| JP | 5-143624 A | 6/1993 |
| JP | 6-44280 A | 2/1994 |
| JP | 11-296527 A | 10/1999 |
| WO | WO00/25243 A1 | 5/2000 |

* cited by examiner

*Primary Examiner*—F. Zeender
*Assistant Examiner*—Christopher Buchanan
(74) *Attorney, Agent, or Firm*—Sughrue Mion, PLLC

(57) ABSTRACT

A system constituted by a product information supply server 2, an automatic graphic server 3, an order processing server 4 and a product information database 1. The servers 2, 3 and 4 may be connected to product information database 1 on a network 5, wherein product information is supplied and an order is accepted on the basis of a request from a customer terminal 6. The product information supply server 2 searches and supplies various pieces of product information in accordance with the request from the customer terminal 6. The product information supply server 2 searches a product specification database 11 on the basis of the product specification information entered from the customer terminal 6, extracts a call number of a relevant product from the product specification database 11, and supplies the call number of the relevant product together with price information and delivery to the customer terminal 6.

12 Claims, 8 Drawing Sheets

FIG. 5

LG-ADVICE

[CLOSE] [INVESTIGATE] (44) [REQUEST] (45) [CLEAR] [HELP] [ORDER] (46)

REQUEST CONTENT | PRODUCT SPECIFICATION | DRAWING SPECIFICATION

PRODUCT CLASSIFICATION
- ○ RAIL BEARING ASSEMBLY  ○ BEARING ASSEMBLY  ○ SINGLE RAIL

REQUEST CONTENT
- ☐ RECEIVE DRAWING DATA BY MAIL
- ☐ CONVERT INTO AN ORDERABLE CALL NUMBER
- FORM
  - ☐ FOR SPECIFICATION CONFIRMATION/PRINTING
  - ☐ FOR READING SHAPE DATA 2D CAD
  - ☐ FOR READING SHAPE DATA 3D CAD
- ☐ GIVE IMMEDIATE DELIVERY OF PRODUCT PRIORITY
- ☐ OUTPUT DRAWING THROUGH FACSIMILE
- FACSIMILE NUMBER [       ]

FIG. 6

LG-ADVICE

CLOSE | INVESTIGATE | REQUEST | CLEAR | HELP | ORDER

44 — INVESTIGATE
45 — REQUEST
46 — ORDER

REQUEST CONTENT | PRODUCT SPECIFICATION | DRAWING SPECIFICATION

NOTATION LANGUAGE
● JAPANESE  ○ ENGLISH  ○ JAPANESE AND ENGLISH

CUSTOMER INFORMATION
COMPANY NAME [ONE LINE ▼]  MR.
MACHINE TO BE USED
PLACE TO BE USED
DRAWING NUMBER

*FIG. 7*

| LG-ADVICE | |
|---|---|
| RESULT | |
| CALL NUMBER: | LH202000ANC4T03PCZ |
| PRICE: | |
| DELIVERY: | 3 DAYS AFTER ORDERED |
| ADDRESS: | |

OK

71

PRODUCT PURCHASE SUPPORTING SYSTEM

BACKGROUND OF THE INVENTION

1. Field of the Invention

The present invention relates to a product purchase supporting system by which information of products, particularly information of precision machine components such as linear guides, ball screws, or the like, and mechatronic products such as XY tables, DD motors, or the like is supplied, and successively, orders of the products having their information supplied are accepted.

2. Description of the Related Art

In machinery and equipment design, it is important to investigate precision machine components to be used such as linear guides, ball screws, or the like, and mechatronic products to be used such as XY tables, DD motors, or the like. Information to be used for the investigation may include such items as, drawing data, CAD data, delivery information, and price information. In addition, once it has been decided during the design that a certain component or product should be used in the machine or equipment, accurate and reliable ordering of the component or product becomes important.

Heretofore, in selecting and ordering such precision machine components and mechatronic products, conventional means such as referring to catalogs and investigating the specifications of products were used to discover and determine an appropriate product. After that determination, call numbers of different products were identified in accordance with dimensional information or the like, and then, inquiries about delivery, price, etc., and orders for the products were made to selling shops or suppliers.

However, there are numerous precision machine components and mechatronic products, and therefore, it is not easy to select the optimal one from those products. Further, because inquiries and ordering of each product require several human interactions, accuracy in ordering was reduced.

SUMMARY OF THE INVENTION

An object of the present invention is to provide a system by which information concerning products required by customers can be supplied speedily and precisely, and easy and accurate order processing can be carried out.

In order to accomplish the object above, the following means are adopted. According to the present invention, there is provided a product purchase supporting system for supplying product information and supporting product purchase, which includes a product information database operable to store product information items and manage the product information items by associating the product information items with one another, the product information items including product specifications and product call numbers. The database may be linked by a product information supply server operable to search, obtain, and transmit the product information items from the product information database in response to a user query, the user query including information that can be associated with at least one of the stored product information items. To access the product information, an input device is used. The input device can take on many different forms, including a computer terminal for a customer, a handheld wireless device, etc.

The user input device is operable to initiate the user query and obtain applicable product information items from the product information supply server, wherein when information included in the user query is the same as at least one of the product specifications, the product information supply server searches, obtains, and transmits as the applicable product information items, the product call numbers associated with the at least one of the product specifications.

Thus, the present invention allows for easy search of product information items using the associations incorporated into the database.

In another embodiment, the database may include prices of the products and associations between the prices of the products and the product call numbers, and in response to the user query, the product information supply server searches, obtains, and transmits to the user input device the prices of the products associated with the information in the user query.

Further, information regarding delivery information of the products and associations between the delivery information of the products and the product call numbers may be included in the present invention. As such, in response to the user query, the product information supply server searches, obtains, and transmits to the user input device the delivery information of the products associated with the information in the user query.

The product purchase supporting system according to the present invention is further constituted by drawing creating means such as a drawing unit or computer-aided design system. In this embodiment, the product information items further include product drawing information and associations between the product drawing information and the product call numbers. Accordingly, the drawing unit is operable to develop a product drawing using the drawing information items obtained from the product information supply server in response to the user query and provide the product drawing to the user input device. As stated, if a CAD system is used, the drawing information may take the form of data that supports computer-aided design.

In another embodiment, the product information database according to the present invention further contains associations between product call numbers for products of a plurality of suppliers. As such, in response to the user query, the product information supply server searches, obtains, and transmits to the user input device the product call numbers for products of a plurality of suppliers associated with the information in the user query. Therefore, when a call number of one of other companies' products is entered from the customer terminal through the network, the product information supply server searches the product information database and supplies product information of a relevant product to the user input device.

To facilitate the ordering process, the product purchase supporting system of the present invention may include an order-processing unit operable to process orders based on the product call numbers. In this embodiment, the product information items further include sales management information of the products and associations between the sales management information of the products and the product call numbers, and the order-processing unit is operable to execute order processing using the sales management information obtained from the product information supply server in response to the user query.

The product purchase supporting system according to the present invention may be employed, for example, to support purchase of precision machine components such as linear guides, ball screws, or the like; and mechatronic products such as XY tables, DD motors, or the like. Of course, other uses for the present invention are not limited to these examples, since the present invention may be employed to streamline other applications where data storage, search, retrieval, drawing preparation, and order processing become too complex and inefficient to perform manually.

BRIEF DESCRIPTION OF THE DRAWINGS

FIG. 3 is a display example of a customer terminal at the time of log in;

FIG. 5 is an example of a selection screen of the supply request information;

FIG. 6 is an example of a drawing specification selecting screen;

FIG. 7 is an example of a reply screen; and

DETAILED DESCRIPTION OF THE INVENTION

Figure 1:
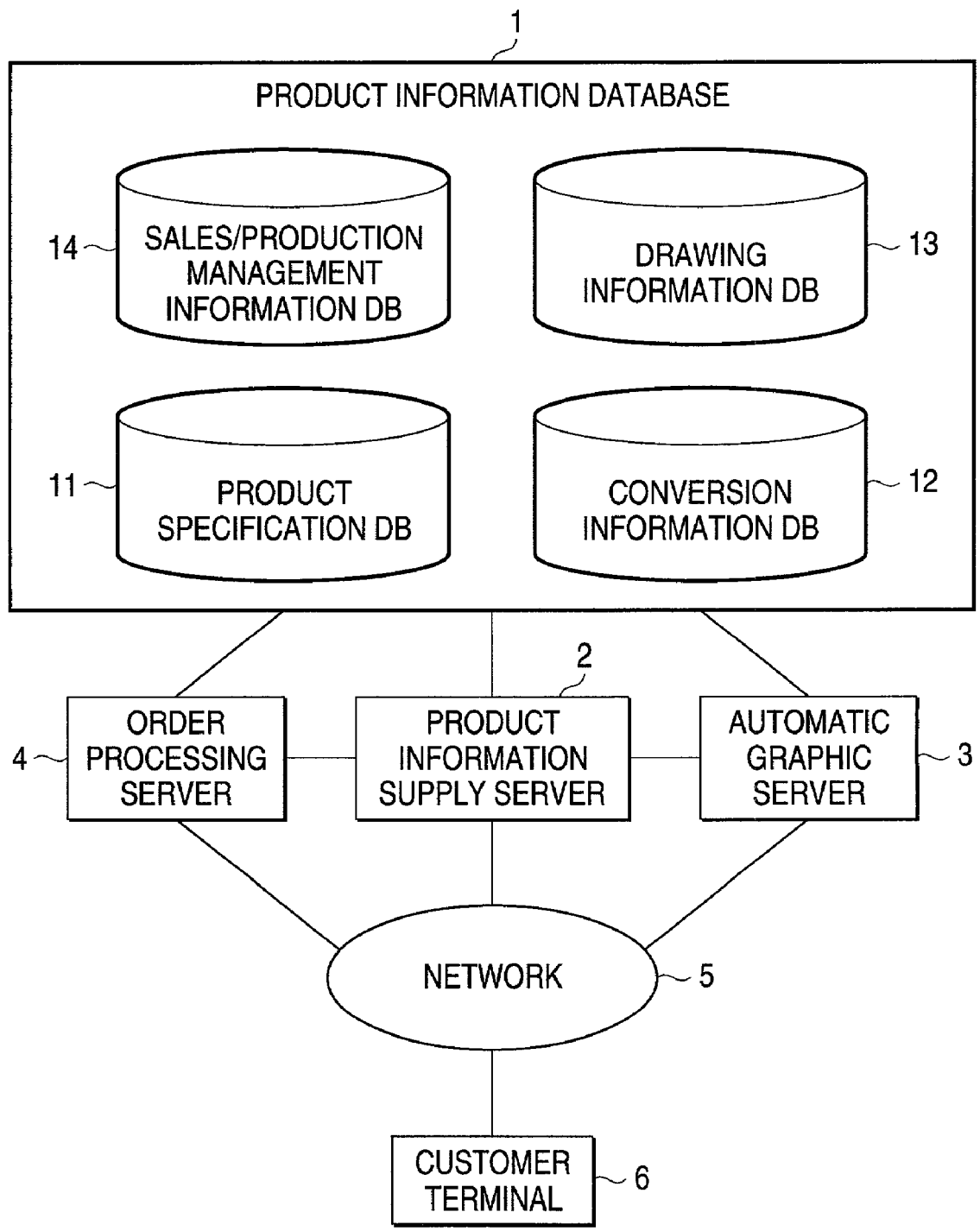
FIG. 1 is a diagram showing a schematic configuration of an embodiment of the present invention.

Embodiments of the present invention will be described with reference to FIGS. 1 through 8. FIG. 1 is a diagram showing a schematic configuration of an embodiment of the present invention. A system depicted in FIG. 1 may be constituted by a product information supply server 2, an automatic graphic server 3, an order processing server 4, and a product information database 1. The servers 2, 3 and 4 are connected to the product information database 1 by, for example, a network 5. On the basis of a request from a user input device, hereinafter depicted in the form of a customer terminal 6, the system supplies the customer terminal 6 with product information and accepts an order.

The product information database 1 is provided for storing and managing various items of information as to products to be supplied. The product information database 1 may be constituted by a product specification data base 11, a conversion information database 12, a drawing information database 13, and a sales/production management information database 14. These databases do not have to necessarily be provided in the above-mentioned sections, but may be integrated into any desirable section or sections. In one embodiment, these databases are designed to be associated with each other.

The product specification database 11 may store product specifications corresponding to, for example, call numbers of products. The conversion information database 12 may store the call numbers of the products of one company that correspond to call numbers of other companies' products. The drawing information database 13 may store product drawing information in association with the call numbers of the products, as well as data that can be used in computer-aided design. The sales/production management information database 14 may store sales management information such as product price, delivery, order information and so on, and production management information in association with the call numbers of the products correspondingly. Of course, the product information may be stored in other database configurations.

The product information supply server 2 may be designed for searching and supplying various pieces of product information in response to a request from the customer terminal 6. Product identification is performed in such a manner that the product specification database 11 is searched on the basis of the product specification information entered from the customer terminal 6 to thereby obtain a call number of a relevant product. In this case, if there is no call number for the relevant product, a new call number may be created and obtained for the relevant product.

In addition to the call number of the product, the information to be supplied to the customer may contain information such as price, delivery and drawing information. These pieces of information are searched from the sales/production management information database 14 and the drawing information database 13. Incidentally, in consideration of factors such as a processing burden, the searching and plotting process of the drawing information may be performed by the automatic graphic server 3 connected to the drawing information database 13. Further, the supply of the created drawing information may also be performed by the automatic graphic server 3.

When a product specification is to be entered, the product information supply server 2 supplies the customer terminal 6 with display information for supporting the specification entrance. Further, prior to the identification of the product specification, the product specification information of the company corresponding to the call number of other company's product is supplied. These pieces of information may be stored in a not-shown memory in the product information supply server 2.

The automatic graphic server 3 creates a drawing of the product by use of the drawing information of the product searched from the drawing information database 13 on the basis of the instruction of the product information supply server 2, and supplies the created drawing to the customer terminal 6. In response to the request from the customer or user, CAD data may also be supplied to the customer terminal 6.

When the product requested by the customer is identified and an order is placed by the customer, the order processing server 4 performs the order processing by using the call number of the product on the basis of the instruction of the product information supply server 2. At that time, the order processing server 4 uses the information of the sales/production management information database 14 and stores the order content.

Figure 2:
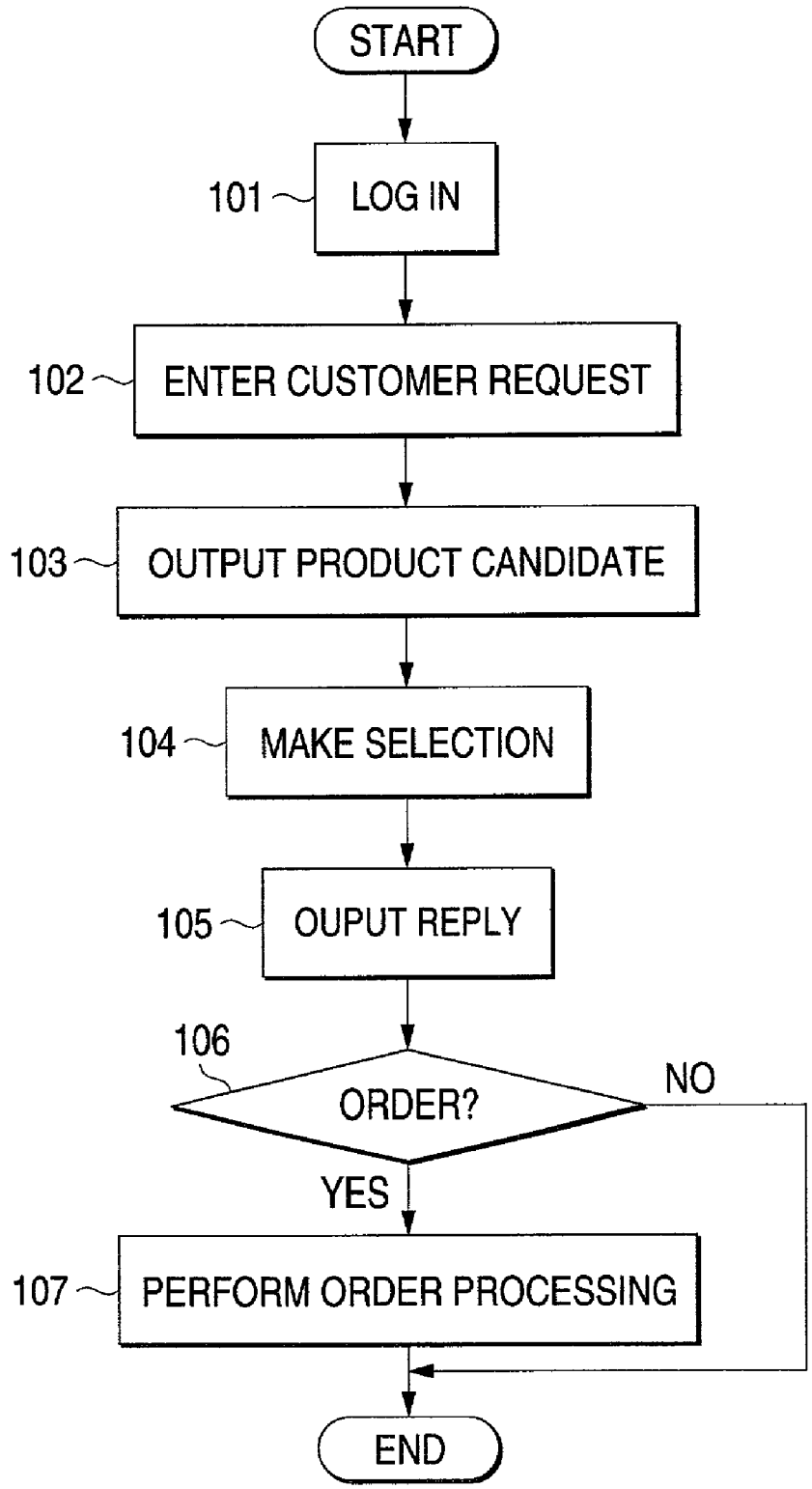
FIG. 2 is a flow chart showing a schematic operation of the system depicted in FIG. 1.

Next, the schematic operation of the system depicted in FIG. 1 will be described. FIG. 2 is a schematic flow chart in the case where a customer uses the system to receive the product information and to place an order. Description will be made below in accordance with the flow chart. Incidentally, in the example, the product is assumed to be a linear guide.

Figure 3:
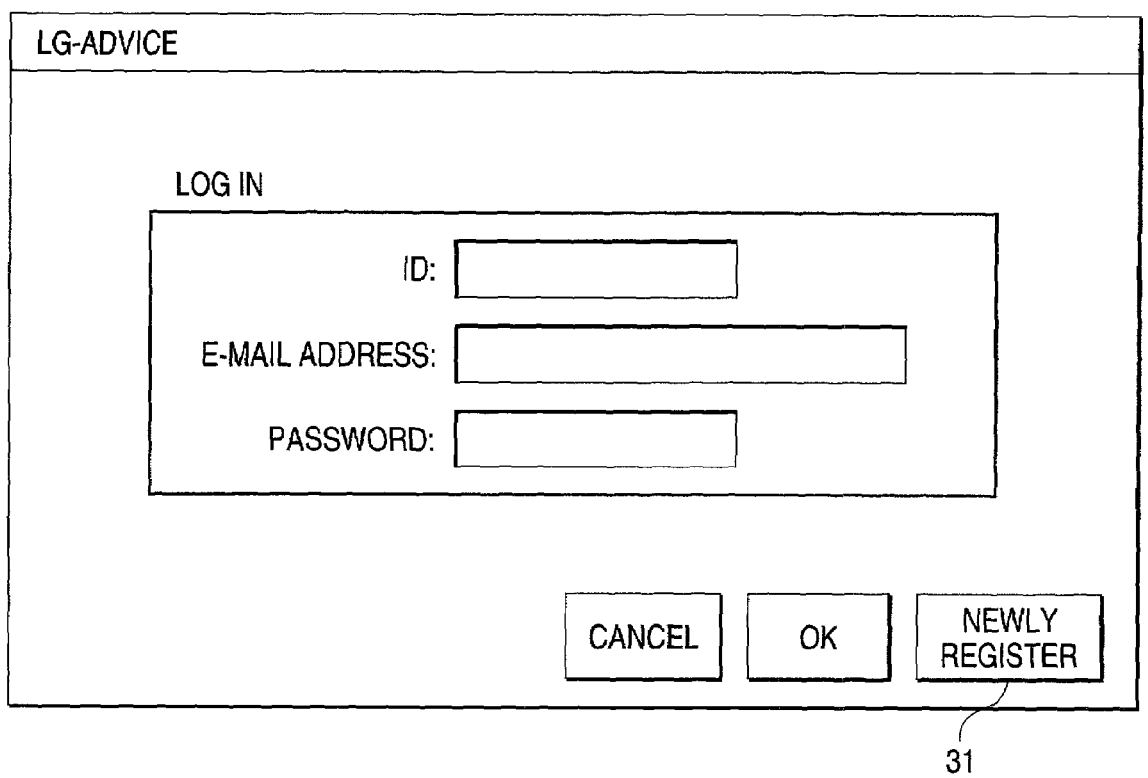

A customer connects a terminal 6 (also referred to as a user input device) to the product information supply server 2 on the network, and logs in (Step 101). At the time of log in, the product information supply server 2 transmits a screen information shown in FIG. 3 to the customer terminal 6, prompts the customer to enter information, such as an ID, an E-mail address and a password which are registered in advance, and performs user authentication. In the case where a new registration is to be made, a button 31 shown in FIG. 3 is pressed so that the routine of the process goes to a new registration process. Of course, one of ordinary skill in the art will recognize that other methods may be employed for entering and processing the registration information.

Figure 4:
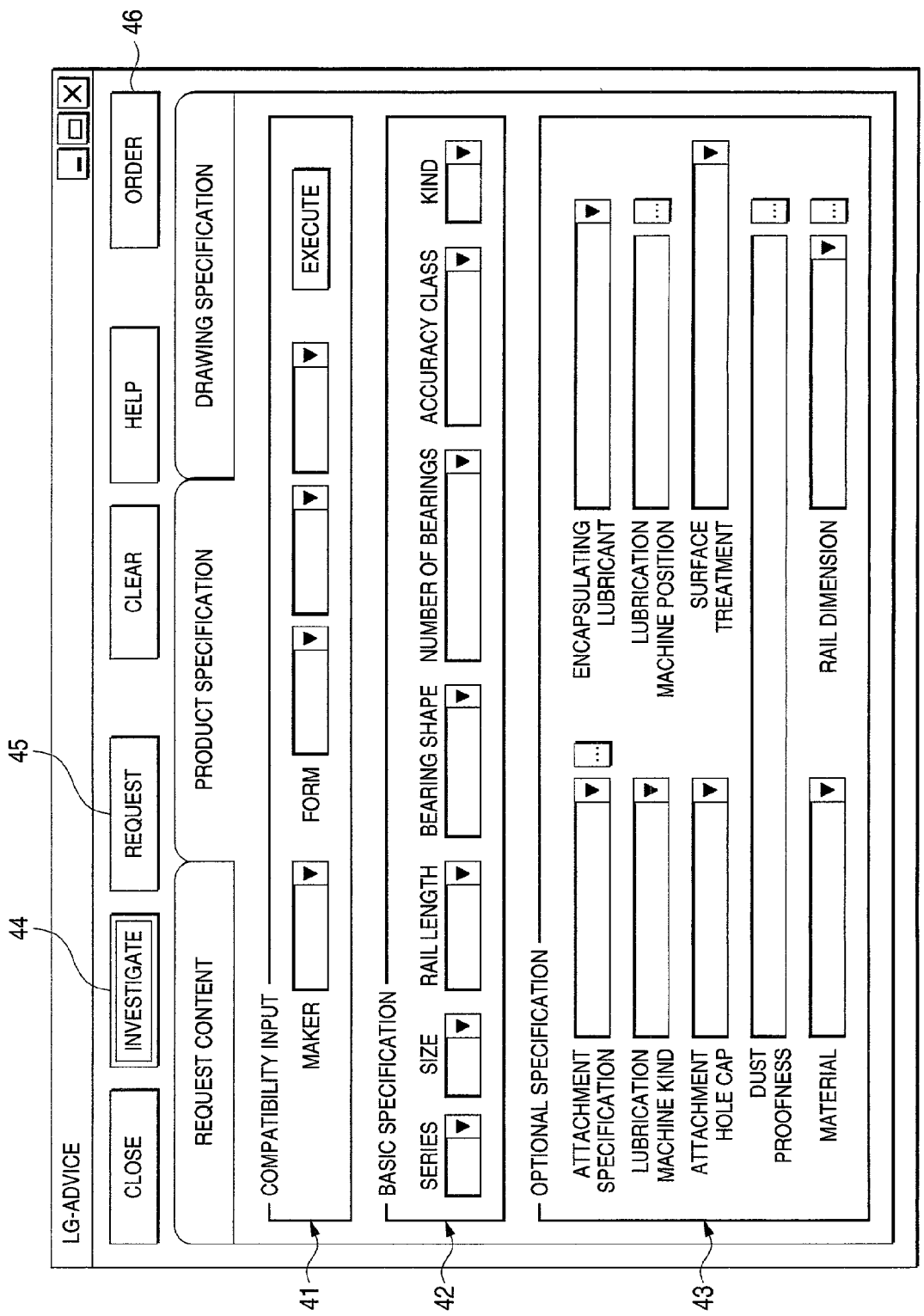
FIG. 4 is an example of a customer request entering screen.

When the user authentication is completed, the product information supply server 2 transmits customer request entering screen information shown in FIG. 4 to the customer terminal 6 and prompts the customer to enter the request information (Step 102). First, in order to identify the product, a product specification is entered. When a product is identified on the basis of the entered basic specification, the basic specification items shown in an area 42 are entered or selected. At that time, because standard data are displayed on the optional specification of an area 43, the optional specification may be changed if necessary.

Next, the selection screen of the supply request information shown in FIG. 5 is displayed and required information is selected. When the drawing information is requested on this occasion, the drawing specification selecting screen shown in FIG. 6 is further displayed and a drawing specification is instructed.

When an "investigate" button 44 is pressed after the above information is entered, the entered specification information is transmitted to the product information supply server 2. The product information supply server 2 searches the product specification database 11 and obtains a call number of a relevant product. Further, on the basis of the call number of the relevant product obtained thus, the product information supply server 2 may search the sales/production management information database 14 and extract price and delivery information there from. The extracted information may then be transmitted to the customer terminal 6 (Step 103). At that time, if catalog data and schematic drawing information of a candidate product are also transmitted, product selection by the customer can be made easy. In Step 103, when the product is selected and transmitted to the product information supply server 2, the product information supply server 2.transmits a reply screen shown in FIG. 7 to the customer terminal 6 (Step 105). Incidentally, when there is one candidate for the relevant product, Step 103 and Step 104 can be omitted.

When the user is satisfied with the supplied result, an "OK" button 71 is pressed, and the routine of the process goes to any one of the screens shown in FIGS. 4 through 6, so that a "request" button 45 is pressed. When the drawing information is requested, the product information supply server 2 instructs the automatic graphic server 3 to create the drawing. Accordingly, the information plotted by the automatic graphic server 3 is supplied in a requested method (for example, E-mail). The same procedure is carried out also for the case of CAD data.

When an immediate order is placed after the supplied product information is received, an "order" button 46 on any one of the screens shown in FIGS. 4 through 6 is pressed and an order is requested. When the order request is transmitted to the product information supply server 2, the product information supply server 2 instructs the order processing server 4 to process the order and transfers the required information to the order processing server 4. As the method for processing the order by use of the network, various methods may be used and description thereof will be omitted here.

Figure 8:
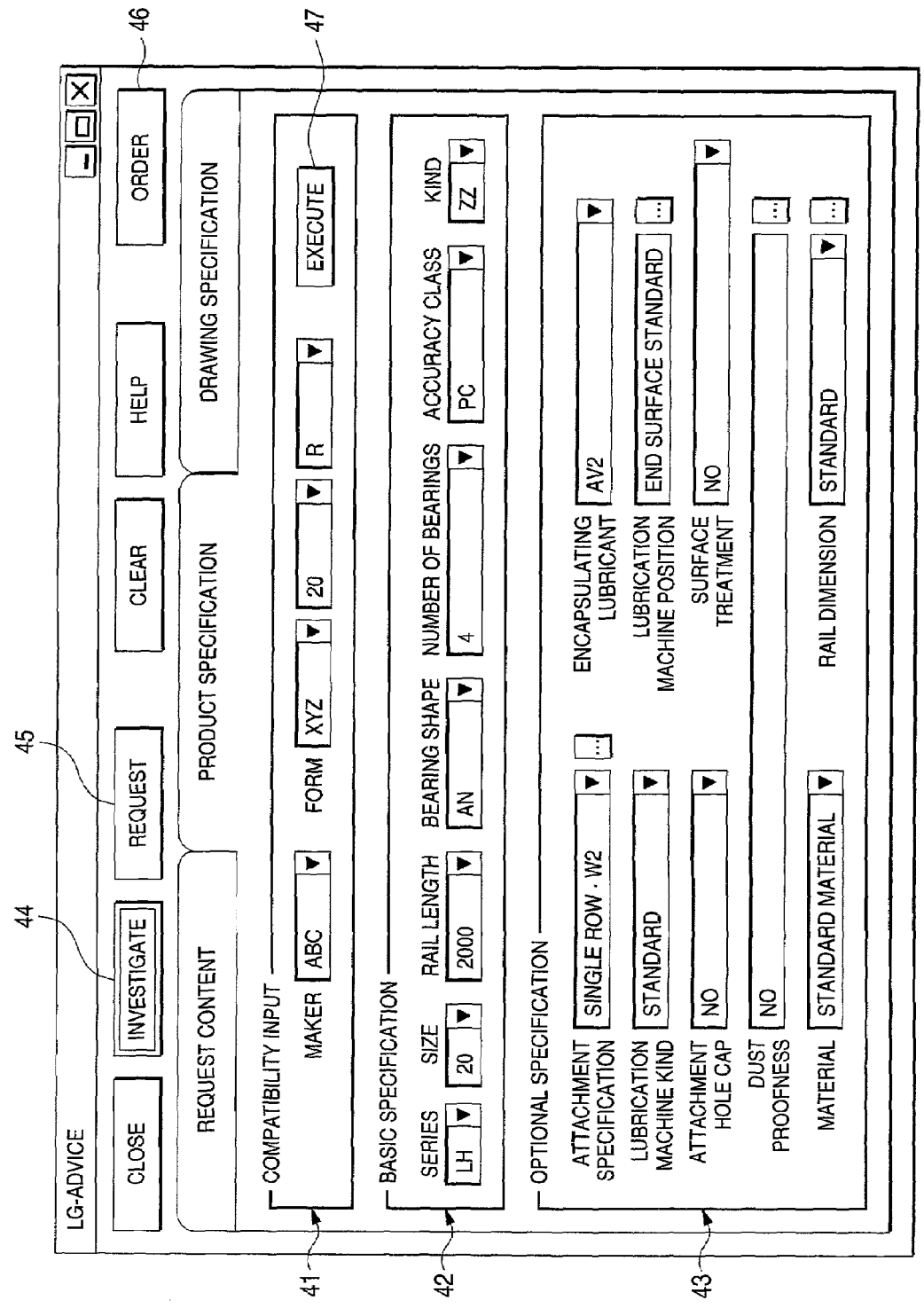
FIG. 8 is a display example when a compatible product is entered.

Next, description will be made as to the case where a specification of a product is entered by use of a call number of another company's product. All the items of the area 41 on the screen shown in FIG. 4 for the call number of other company's product are entered. FIG. 8 shows an example of a display screen when an "execute" button 47 is pressed after entrance in the area 41. When the "execute" button 47 is pressed, the entered information of the area 41 is transmitted to the product information supply server 2. The product information supply server 2 searches the conversion information database 12 and extracts a corresponding call number of the company. The product information supply server 2 further searches the product specification database 11 and transmits the specification of the product having the corresponding call number to the customer terminal 6. The product specification transmitted thus are displayed on the areas 42 and 43 as shown in FIG. 8. As to the remaining operations, description will be omitted because it is the same as described above.

Therefore, the present invention provides a system by which information concerning products required by customers can be supplied speedily and precisely, and easy and accurate order processing can be carried out.

What is claimed is:

1. A linear guide purchase supporting system for supplying linear guide information and supporting linear guide purchase, comprising:
   a linear guide information database configured to store linear guide information items and managing the linear guide information items by associating the linear guide information items with one another, the linear guide information items including linear guide specifications and linear guide call numbers;
   a linear guide information supply server configured to search, obtain, and transmit the linear guide information items from the linear guide information database in response to a user query, the user query including information that can be associated with at least one of the stored linear guide information items, wherein, if there is no call number for a linear guide, a new call number is created and obtained for said linear guide; and
   a user input device configured to initiate the user query and obtain applicable linear guide information items from the linear guide information supply server, wherein when information included in the user query is the same as at least one of the linear guide specifications, the linear guide information supply server searches, obtains, and transmits as the applicable linear guide information items, the linear guide call numbers associated with the at least one of the linear guide specifications; and
   an automatic graphic server configured to create a linear guide drawing using linear guide drawing information stored in said linear guide information database in response to an instruction from said linear guide information supply server, wherein the linear guide information database is configured to store information associating the linear guide drawing information and the linear guide call numbers,
   wherein the linear guide specification comprises a basic specification and an optional specification,
   wherein, when the basic specification is input from the user input device, the user input device displays standard data of the optional specification such that the optional specification is changeable.

2. A linear guide purchase supporting system according to claim 1, wherein the linear guide information items further include prices of the linear guides and associations between the prices of the linear guides and the product call numbers, and in response to the user query, the linear guide information supply server searches, obtains, and transmits to the user input device the prices of the linear guides associated with the information in the user query.

3. A linear guide purchase supporting system according to claim 1, wherein the linear guide information items further include delivery information of the linear guides and associations between the delivery information of the linear guides and the linear guide call numbers, and in response to the user query, the linear guide information supply server searches, obtains, and transmits to the user input device the delivery information of the linear guides associated with the information in the user query.

4. A linear guide purchase supporting system according to claim 1, wherein the linear guide drawing information contains data formatted for computer-aided design.

5. A linear guide purchase supporting system according to claim 1, further comprising an order-processing unit configured to process orders based on the linear guide call numbers,
   wherein the linear guide information items further include sales management information of the linear guides and associations between the sales management information of the linear guides and the product call numbers, and the order-processing unit is configured to execute order processing using the sales management information obtained from the linear guide information supply server in response to the user query.

6. The linear guide purchase supporting system of claim 1, wherein in response to an input or selection of at least three of series, size, rail length, bearing shape, number of bearings and accuracy class in the linear guide information items from the user input device, the automatic graphic server develops the linear guide drawing using the linear guide drawing information of the linear guide information database, and the linear guide information supply server provides a developed linear guide drawing to the user input device.

7. The linear guide purchase supporting system of claim 1, wherein in response to an input or selection of series, size, rail length, bearing shape, number of bearings and accuracy class in the linear guide information items from the user input device, the automatic graphic server develops the linear guide drawing using the linear guide drawing information of the linear guide information database, and the linear guide information supply server provides a developed linear guide drawing to the user input device.

8. A linear guide purchase supporting system according to claim 1, wherein the linear guide information supply server issues the instruction based on the linear guide call numbers received from the linear guide information database.

9. A linear guide purchase supporting system according to claim 1, wherein the linear guide drawing information is not a final drawing.

10. A linear guide purchase supporting system according to claim 8, wherein the linear guide drawing information is not a final drawing.

11. The linear guide purchase supporting system according to claim 1, wherein the new call number does not exist in the linear guide information database before being created.

12. A product purchase supporting system comprising:
a product information database comprising:
a product specification database configured to store product specifications of a plurality of products of one company and call numbers of the plurality of products of the one company; and
a conversion information database configured to store associations between call numbers of products of other companies and the call numbers stored in the product specification database; and
a product information server configured to search the product information database, in response to an input from a user input device, and to transmit product information to the user input device to support a purchase of a product,
wherein, when a product specification of one of the plurality of products of the one company is input from the user input device, the product information server searches the product specification database and transmits a corresponding one of the call numbers of the plurality of products of the one company, and
wherein, when one of the call numbers of products of the other companies is input from the user input device, the product information server searches the conversion information database to extract an associated one of the call numbers stored in the product specification database, and further searches the product specification database and transmits a product specification corresponding to the associated one of the call numbers
wherein the product comprises a linear guide, and
wherein, if there is no call number corresponding to a product specification input from the user input device, a new call number is created for the product specification input from the user input device, and
wherein the product specification comprises a basic specification and an optional specification, wherein, when the basic specification is input from the user input device, the product information server causes the user input device to display standard data of the optional specification such that the optional specification is changeable.

* * * * *